United States Patent
Yebka et al.

(10) Patent No.: US 10,439,418 B2
(45) Date of Patent: Oct. 8, 2019

(54) SYSTEMS AND METHODS TO CHARGE A BATTERY AT DIFFERENT CHARGE RATES AND INDICATE WHEN CHARGING AT A FASTER RATE IS AVAILABLE

(71) Applicant: Lenovo (Singapore) Pte. Ltd., New Tech Park (SG)

(72) Inventors: Bouziane Yebka, Apex, NC (US); Philip John Jakes, Durham, NC (US); Tin-Lup Wong, Chapel Hill, NC (US)

(73) Assignee: Lenovo (Singapore) Pte. Ltd., Singapore (SG)

( * ) Notice: Subject to any disclaimer, the term of this patent is extended or adjusted under 35 U.S.C. 154(b) by 314 days.

(21) Appl. No.: 15/223,745

(22) Filed: Jul. 29, 2016

(65) Prior Publication Data

US 2018/0034284 A1 Feb. 1, 2018

(51) Int. Cl.
*H02J 7/00* (2006.01)
*H01M 10/44* (2006.01)

(52) U.S. Cl.
CPC .............. *H02J 7/007* (2013.01); *H01M 10/44* (2013.01); *H02J 7/0047* (2013.01); *H02J 7/0088* (2013.01); *H02J 2007/005* (2013.01)

(58) Field of Classification Search
CPC .................................................... H02J 7/0093
(Continued)

(56) References Cited

U.S. PATENT DOCUMENTS 5,898,290 A 4/1999 Beard et al.
6,081,097 A 6/2000 Seri et al.
(Continued)

FOREIGN PATENT DOCUMENTS

JP H08163788 A 6/1996
JP H11341698 A 12/1999
(Continued)

OTHER PUBLICATIONS

Bouziane Yebka, Philip John Jakes, Tin-Lup Wong, "Systems and Methods to Increase Rate of Charge of Battery Based on Impedance", related pending U.S. Appl. No. 15/220,606, filed Jul. 27, 2016.
(Continued)

*Primary Examiner* — Edward Tso
*Assistant Examiner* — Ahmed H Omar
(74) *Attorney, Agent, or Firm* — John L. Rogitz; John M. Rogitz

(57) ABSTRACT

In one aspect, a device includes a processor, at least one system component accessible to the processor, a battery accessible to the processor and that provides power to the processor and the at least one system component, a display accessible to the processor and powered by the battery, and storage accessible to the processor. The storage bears instructions executable by the processor to permit charging of the battery at a first rate during a first charging instance and to permit charging of the battery at a second rate during a second charging instance, where the second rate is slower than the first rate and the second charging instance is subsequent to the first charging instance. The instructions are also executable to provide an indication regarding the availability of again charging the battery at the first rate subsequent to the first charging instance.

20 Claims, 5 Drawing Sheets

(58) Field of Classification Search
USPC .................................................. 320/107, 160
See application file for complete search history.

(56) References Cited

U.S. PATENT DOCUMENTS

| | | |
|---|---|---|
| 6,160,490 A | 12/2000 | Pace et al. |
| 7,191,077 B2 | 3/2007 | Mese et al. |
| 8,125,186 B2 | 2/2012 | Carkner |
| 8,259,221 B1 | 9/2012 | Kaplan et al. |
| 8,380,999 B1 | 2/2013 | Robison et al. |
| 8,729,862 B2 | 5/2014 | Yebka et al. |
| 8,994,339 B1 | 3/2015 | Kam |
| 2001/0035732 A1 | 11/2001 | Sakakibara |
| 2004/0130295 A1 | 7/2004 | Kim |
| 2004/0199297 A1 | 10/2004 | Schaper et al. |
| 2004/0222768 A1 | 11/2004 | Moore et al. |
| 2004/0225333 A1 | 11/2004 | Greatbatch et al. |
| 2007/0076921 A1 | 4/2007 | Living |
| 2007/0188134 A1 | 8/2007 | Hussain et al. |
| 2009/0024863 A1 | 1/2009 | Karstens |
| 2009/0085528 A1 | 4/2009 | Yamada |
| 2009/0273318 A1 | 11/2009 | Rondoni et al. |
| 2010/0026240 A1 | 2/2010 | Jiang et al. |
| 2010/0060232 A1 | 3/2010 | Boyles et al. |
| 2010/0085017 A1 | 4/2010 | Heeringa et al. |
| 2010/0123436 A1 | 5/2010 | Herrod et al. |
| 2010/0217466 A1 | 8/2010 | Ichikawa |
| 2010/0289457 A1 | 11/2010 | Onnerud et al. |
| 2011/0018679 A1 | 1/2011 | Davis et al. |
| 2011/0057603 A1 | 3/2011 | Marty et al. |
| 2011/0313613 A1 | 12/2011 | Kawahara et al. |
| 2011/0316548 A1 | 12/2011 | Ghantous et al. |
| 2012/0098488 A1 | 4/2012 | Ichikawa |
| 2012/0200266 A1 | 8/2012 | Berkowitz et al. |
| 2012/0299554 A1 | 11/2012 | Kruglick |
| 2014/0002025 A1 | 1/2014 | Yamamoto et al. |
| 2014/0062415 A1 | 3/2014 | Barsukov et al. |
| 2014/0195826 A1 | 7/2014 | Wojcik et al. |
| 2015/0048803 A1 | 2/2015 | Noh et al. |
| 2015/0084778 A1* | 3/2015 | Mittal ............... G01R 19/16542 340/636.16 |
| 2015/0145480 A1 | 5/2015 | Yebka et al. |
| 2015/0236528 A1* | 8/2015 | Kim ..................... G01R 17/00 320/107 |
| 2017/0077717 A1 | 3/2017 | Lundgren et al. |

FOREIGN PATENT DOCUMENTS

| | | | |
|---|---|---|---|
| JP | 2001-218378 | * 8/2001 | ............... H02J 7/02 |
| JP | 2001218378 A | 8/2001 | |
| JP | 2002330547 A | 11/2002 | |
| JP | 2009244088 A | 10/2009 | |
| JP | 2009543531 A | 12/2009 | |
| JP | 2010521948 A | 6/2010 | |
| JP | 2012090480 A | 5/2012 | |
| JP | 2012526517 A | 10/2012 | |
| JP | 2014121261 A | 6/2014 | |
| KR | 20150019295 | 2/2015 | |

OTHER PUBLICATIONS

John Weldon Nicholson, Axel Ramirez Flores, Howard Jeffrey Locker, Scott Edwards Kelso, John Miles Hunt, Kenneth Scott Seethaler, Larry Glenn Estes, Jeremy Robert Carlson, "Systems and Methods to Increase and Decrease Charging Current to Battery", related U.S. Appl. No. 14/143,429, Applicant's response to Non-Final Office Action filed Dec. 15, 2017.

John Weldon Nicholson, Axel Ramirez Flores, Howard Jeffrey Locker, Scott Edwards Kelso, John Miles Hunt, Kenneth Scott Seethaler, Larry Glenn Estes, Jeremy Robert Carlson, "Systems and Methods to Increase and Decrease Charging Current to Battery", related U.S. Appl. No. 14/143,429, Non-Final Office Action dated Sep. 29, 2017.

John Weldon Nicholson, Axel Ramirez Flores, Howard Jeffrey Locker, Scott Edwards Kelso, John Miles Hunt, Kenneth Scott Seethaler, Larry Glenn Estes, Jeremy Robert Carlson, "Systems and Methods to Increase and Decrease Charging Current to Battery", related U.S. Appl. No. 14/143,429, Applicant's response to Non-Final Office Action filed Mar. 10, 2017.

John Weldon Nicholson, Axel Ramirez Flores, Howard Jeffrey Locker, Scott Edwards Kelso, John Miles Hunt, Kenneth Scott Seethaler, Larry Glenn Estes, Jeremy Robert Carlson, "Systems and Methods to Increase and Decrease Charging Current to Battery", related U.S. Appl. No. 14/143,429, Final Office Action dated May 18, 2017.

John Weldon Nicholson, Axel Ramirez Flores, Howard Jeffrey Locker, Scott Edwards Kelso, John Miles Hunt, Kenneth Scott Seethaler, Larry Glenn Estes, Jeremy Robert Carlson, "Systems and Methods to Increase and Decrease Charging Current to Battery", related U.S. Appl. No. 14/143,429, Applicant's response to Final Office Action filed Aug. 10, 2017.

John Weldon Nicholson, Axel Ramirez Flores, Howard Jeffrey Locker, Scott Edwards Kelso, John Miles Hunt, Kenneth Scott Seethaler, Larry Glenn Estes, Jeremy Robert Carlson, "Systems and Methods to Increase and Decrease Charging Current to Battery", file history of related U.S. Appl. No. 14/143,429, filed Dec. 30, 2013.

John Weldon Nicholson, Axel Ramirez Flores, Howard Jeffrey Locker, Scott Edwards Kelso, John Miles Hunt, Kenneth Scott Seethaler, Larry Glenn Estes, Jeremy Robert Carlson, "Systems and Methods to Increase and Decrease Charging Current to Battery", related U.S. Appl. No. 14/143,429, Final Office Action dated Feb. 1, 2018.

Bouziane Yebka, Philip John Jakes, Tin-Lup Wong, "Systems and Methods to Increase Rate of Charge of Battery Based on Impedance", related U.S. Appl. No. 15/220,606, Non-Final Office Action dated Aug. 29, 2018.

Bouziane Yebka, Philip John Jakes, Tin-Lup Wong, "Systems and Methods to Increase Rate of Charge of Battery Based on Impedance", related U.S. Appl. No. 15/220,606, Applicants response to Non-Final Office Action filed Nov. 19, 2018.

Bouziane Yebka, Philip John Jakes, Tin-Lup Wong, "Systems and Methods to Increase Rate of Charge of Battery Based on Impedance", related U.S. Appl. No. 15/220,606, Non-Final Office Action dated Mar. 20, 2019.

Bouziane Yebka, Philip John Jakes, Tin-Lup Wong, "Systems and Methods to Increase Rate of Charge of Battery Based on Impedance", related U.S. Appl. No. 15/220,606, Applicant's response to Non-Final Office Action filed Apr. 15, 2019.

* cited by examiner

SYSTEMS AND METHODS TO CHARGE A BATTERY AT DIFFERENT CHARGE RATES AND INDICATE WHEN CHARGING AT A FASTER RATE IS AVAILABLE

FIELD

The present application relates generally to systems and methods to charge a battery at different charge rates and indicate when charging at a faster rate is available.

BACKGROUND

As recognized herein, lithium plating on an as ode of a lithium ion battery can result from charging the battery more rapidly than intercalation can occur. As also recognized herein, lithium plating, whether homogeneous or heterogeneous, is undesirable and can lead to a loss of charge capacity of the battery and even a short circuit, among other things.

SUMMARY

Accordingly, in one aspect a device includes a processor, at least one system component accessible to the processor, a battery accessible to the processor and that provides power to the processor and the at least one system component, a display accessible to the processor and powered by the battery, and storage accessible to the processor. The storage bears instructions executable by the processor to permit charging of the battery at a first rate during a first charging instance and to permit charging of the battery at a second rate during a second charging instance, where the second rate is slower than the first rate and the second charging instance is subsequent to the first charging instance. The instructions are also executable to provide an indication regarding the availability of again charging the battery at the first rate subsequent to the first charging instance.

In another aspect, a method includes permitting charging of a battery at a first rate during a first charging instance and providing an indicator at a device regarding the availability of, subsequent to the first charging instance, again charging the battery at the first rate.

In another aspect, a computer readable storage medium that is not a transitory signal comprises instructions executable by a processor to permit charging of a battery at a first rate during a first charging instance and wait until, subsequent to the first charging instance, a threshold number of additional charge instances has transpired using at least one other rate slower than the first rate before again permitting charging of the battery at the first rate.

The details of present principles, both as to their structure and operation, can best be understood in reference to the accompanying drawings, in which like reference numerals refer to like parts, and in which:

DETAILED DESCRIPTION

Figure 1:
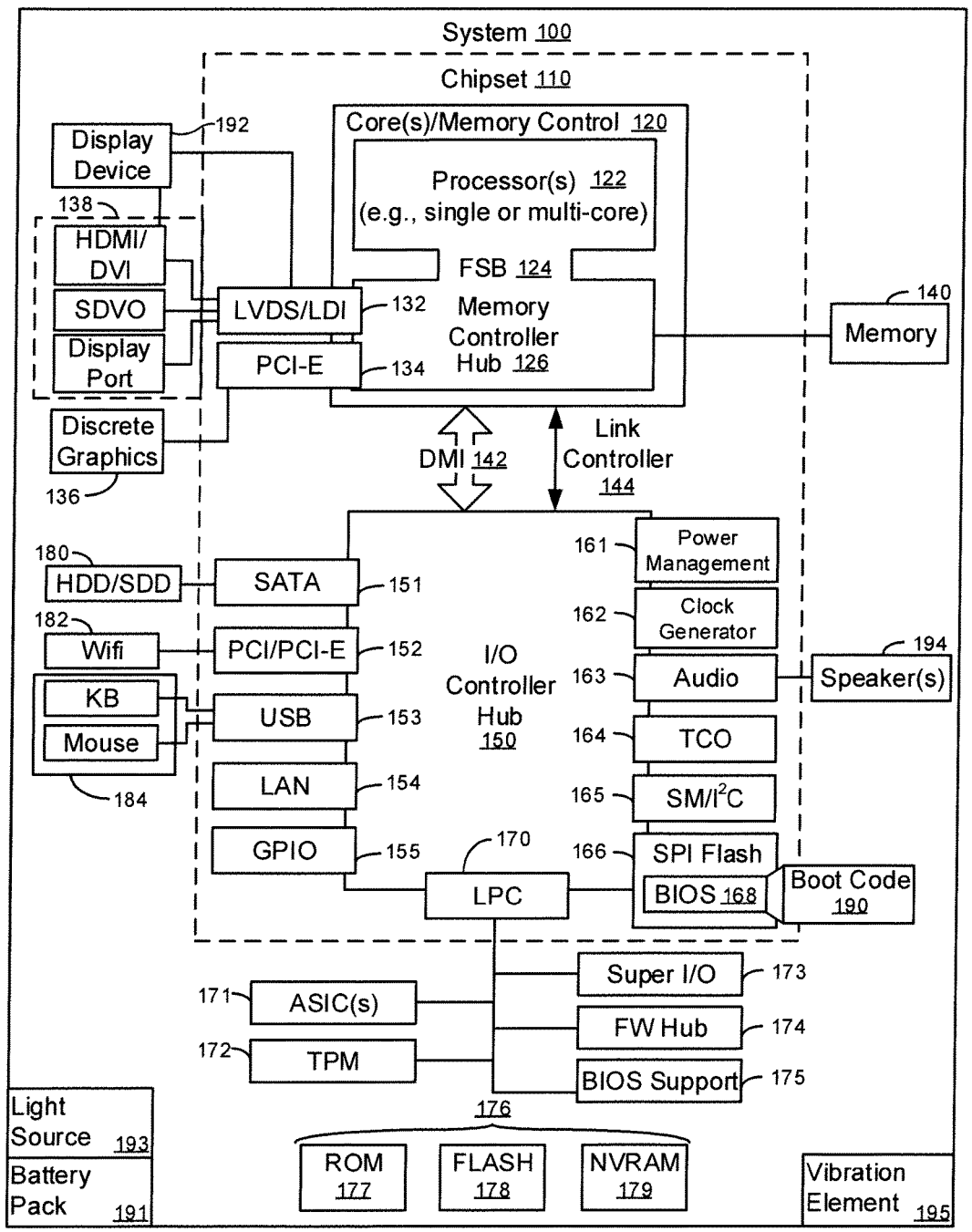
FIG. 1 is a block diagram of an example system in accordance with present principles.

Disclosed herein are systems and methods to charge a battery at different charge rates and to indicate when charging at one of the relatively faster rates of the different rates is available. For instance, a battery in accordance with present principles may be capable of charging at a "normal" rate in which charging does not harm the battery or cause undesirable side effects or damage, other than normal wear and tear. This same battery may also be capable of charging at one or more relatively faster rates than the normal rate, but as recognized herein, it may not always be optimal to charge the battery at one of the faster rates habitually or in consecutive charges owing to various types of battery and/or chemical degradation that may occur. For instance, in a lithium-ion battery, lithium plating may occur (e.g., on the battery's anode and/or electrolyte) as a result of the relatively faster charge.

Thus, some rest time and/or subsequent normal charges may be helpful to reverse the battery and/or chemical degradation. For instance, some rest time and or subsequent normal charges may be helpful for intercalation and/or lithium homogenization to occur in a lithium ion battery to reduce the lithium plating.

With respect to any computer systems discussed herein, a system may include server and client components, connected over a network such that data may be exchanged between the client and server components. The client components may include one or more computing devices including televisions (e.g., smart TVs, Internet-enabled TVs), computers such as desktops, laptops and tablet computers, so-called convertible devices (e.g., having a tablet configuration and laptop configuration), and other mobile devices including smart phones. These client devices may employ, as non-limiting examples, operating systems from Apple, Google, or Microsoft. A Unix or similar such as Linux operating system may be used. These operating systems can execute one or more browsers such as a browser made by Microsoft or Google car Mozilla or another browser program that can access web pages and applications hosted by Internet servers over a network such as the Internet, a local intranet, or a virtual private network.

As used herein, instructions refer to computer-implemented steps for processing information in the system. Instructions can be implemented in software, firmware or hardware; hence, illustrative components, blocks, modules, circuits, and steps are sometimes set forth in terms of their functionality.

A processor may be any conventional general purpose single- or multi-chip processor that can execute logic by means of various lines such as address lines, data lines, and control lines and registers and shift registers. Moreover, any logical blocks, modules, and circuits described herein can be implemented or performed, in addition to a general purpose processor, in or by a digital signal processor (DSP), a field programmable gate array (FPGA) or other programmable logic device such as an application specific integrated circuit (ASIC), discrete gate or transistor logic, discrete hardware components, or any combination thereof designed to perform the functions described herein. A processor can be implemented by a controller or state machine or a combination of computing devices.

Any software and/or applications described by way of flow charts and/or user interfaces herein can include various sub-routines, procedures, etc. It is to be understood that logic divulged as being executed by, e.g., a module can be redistributed to other software modules and/or combined together in a single module and/or made available in a shareable library.

Logic when implemented in software, can be written in as appropriate language such as hut not limited to C# or C++, and can be stored on or transmitted through a computer-readable storage medium (e.g., that is not a transitory signal) such as a random access memory (RAM), read-only memory (ROM), electrically erasable programmable read-only memory (EEPROM), compact disk read-only memory (CD-ROM) or other optical disk storage such as digital versatile disc (DVD), magnetic disk storage or other magnetic storage devices including removable thumb drives, etc.

In an example, a processor can access information over its input lines from data storage, such as the computer readable storage medium, and/or the processor can access information wirelessly from an Internet server by activating a wireless transceiver to send and receive data. Data typically is converted from analog signals to digital by circuitry between the antenna and the registers of the processor when being received and from digital to analog when being transmitted. The processor then processes the data through its shift registers to output calculated data on output lines, for presentation of the calculated data on the device.

Components included in one embodiment can be used in other embodiments in any appropriate combination. For example, any of the various components described herein and/or depicted in the Figures may be combined, interchanged or excluded from other embodiments.

The term "circuit" or "circuitry" may be used in the summary, description, and/or claims. As is well known in the art, the term "circuitry" includes all levels of available integration, e.g., from discrete logic circuits to the highest level of circuit integration such VLSI, and includes programmable logic components programmed to perform the functions of an embodiment as well as general-purpose or special-purpose processors programmed with instructions to perform those functions.

Now specifically in reference to FIG. 1, an example block diagram of an information handling system and/or computer system 100 is shown. Note that in some embodiments the system 100 may be a desktop computer system, such as one of the ThinkCentre® or ThinkPad® series of personal computers sold by Lenovo (US) Inc. of Morrisville, N.C., or a workstation computer, such as the ThinkStation®, which are sold by Lenovo (US) Inc. Morrisville, N.C.; however, as apparent from the description herein, a client device, a server or other machine in accordance with present principles may include other features or only some of the features of the system 100. Also, the system 100 may be, e.g., a game console such as XBOX®, and/or the system 100 may include a wireless telephone, notebook computer, and/or other portable computerized device.

As shown in FIG. 1, the system 100 may include a so-called chipset 110. A chipset refers to a group of integrated circuits, or chips, that are designed to work together. Chipsets are usually marketed as a single product e.g., consider chipsets marketed under the brands INTEL®, AMD®, etc.).

In the example of FIG. 1, the chipset 110 has a particular architecture, which may vary to some extent depending on brand or manufacturer. The architecture of the chipset 110 includes a core and memory control group 120 and an I/O controller hub 150 that exchange information (e.g., data, signals, commands, etc.) via, for example, a direct management interface or direct media inter ace (DMI) 142 or a link controller 144. In the example of FIG. 1, the DMI 142 is a chip-to-chip interface (sometimes referred to as being a link between a "northbridge" and a "southbridge").

The core and memory control group 120 include one or more processors 122 (e.g., single core, or multi-core, etc.) and a memory controller hub 126 that exchange information via a from side bus (FSB) 124. As described herein, various components of the core and memory control group 120 may be integrated onto a single processor die, for example, to make a chip that supplants the conventional "northbridge" style architecture.

The memory controller hub 126 interfaces with memory 140. For example, the memory controller hub 126 may provide support for DDR SDRAM memory (e.g., DDR, DDR2, DDR3, etc.). In general, the memory 140 is a type of random-access memory (RAM). It is often referred to as "system memory."

The memory controller hub 126 can further include a low-voltage differential signaling interface (LVDS) 132. The LVDS 132 may be a so-called LVDS Display Interface (LDI) for support of a display device 192 (e.g., a CRT, a flat panel, a projector, a touch-enabled display, etc.). A block 138 includes some examples of technologies that may be supported via the LVDS interface 132 (e.g., serial digital video. HDMI/DVI, display port). The memory controller hub 126 also includes one or more PCI-express interfaces (PCI-E) 134, for example, for support of discrete graphics 136. Discrete graphics using a PCI-E interface has become an alternative approach to an accelerated graphics port (AGP). For example, the memory controller huh 126 may include a 16-lane (x16) PCI-E port for an external PCI-E-based graphics card (including, e.g., one of more (GPUs). An example system may include AGP or PCI-E for support of graphics.

In examples in which it is used, the I/O hub controller 150 can include a variety of interfaces. The example of FIG. 1 includes a SATA interface 151, one or more PCI-E interfaces 152 (optionally one or more legacy PCI interfaces), one or more USB interfaces 153, a LAN interface 154 (more generally a network interface for communication over at least one network such as the Internet, a WAN, a LAN, etc. under direction of the processor(s) 122), a general purpose I/O interface (OPIO) 155, a low-pin count (LPC) interface 170, a power management interface 161, a clock generator interface 162, an audio interface 163 (e.g., for speakers 194 to output audio), a total cost of operation (TCO) interface 164, a system management bus interface (e.g., multi-master serial computer bus interface) 165, and a serial peripheral flash memory/controller interface (SPI Hash) 166, which, in the example of FIG. 1, includes BIOS 168 and boot code 190. With respect to network connections, the I/O hub controller 150 may include integrated gigabit Ethernet controller lines multiplexed with a PCI-E interface port. Other network features may operate independent of a PCI-E interface.

The interfaces of the I/O hub controller 150 may provide for communication with various devices, networks, etc. For example, where used, the SATA interface 151 provides for reading, writing or reading and writing information on one or more drives 180 such as HDDs, SDDs or a combination thereof, but in any case the drives 180 are understood to be, e.g., tangible computer readable storage mediums that are not transitory signals. The I/O hub controller 150 may also include an advanced host controller interface (AHCI) to support one or more drives 180. The PCI-E interface 152 allows for wireless connections 182 to devices, networks, etc. The USB interface 153 provides for input devices 184 such as keyboards (KB), mice and various other devices (e.g., cameras, phones, storage, media players, etc.).

In the example of FIG. 1, the LPC interlace 170 provides for use of one or more ASICs 171, a trusted platform module (rpm) 172, a super I/O 173, a firmware hub 174, BIOS support 175 as well as various types of memory 176 such as ROM 177, Flash 178, and non-volatile RAM (NVRAM) 179. With respect to the TPM 172, this module may be in the form of a chip that can be used to authenticate software and hardware devices. For example, a TPM may be capable of performing platform authentication and may be used to verify that a system seeking access is the expected system.

The system 100, upon power on, may be configured to execute hoot code 190 for the BIOS 168, as stored within the SPI Hash 166, and thereafter processes data under the control of one or more operating systems and application software (e.g., stored in system memory 140). An operating system may be stored in any of a variety of locations and accessed, for example, according to instructions of the BIOS 168.

Additionally, the system 100 may also include at least one battery pack 191 comprising at least one battery and/or battery cell. The battery pack 191 may be, for instance, in jelly roll format. It may also be in pouch cell format in which the strip(s) of active material are folded. In either case, in accordance with present principles the battery may be a Lithium ion battery or another type of battery.

Furthermore, the battery pack 191 may be electrically coupled to and power the system 100 to power system components, and can also be electrically coupled to at least one charge receiver on the system 100 for receiving a charge from a power source via a battery charger to charge one or more battery cells in the pack 191. Thus, the charge receiver itself can include at least one circuit configured for receiving power (e.g., from a wall outlet via a charger) and doing at least one of: providing current to the system 100 to power it, and providing current to the battery pack 191 to charge at least one battery in the pack 191.

The battery pack 191 may also include a battery management unit/system (BMU) that itself may include elements such as a processor, random access memory (RAM), and non-volatile storage hearing instructions executable by the BMU's processor. The processors 122 and/or the BMU may, independently or in conjunction with each other, control the rate of charge that the at least one battery undergoes during charging.

The battery pack 191 may further include one or more sensors for sensing and measuring things related to the battery pack 191 and/or battery within, such as voltage (e.g., charge and discharge voltage), electric potential, age, impedance, state of charge, temperature, current, anode resistance, electrolyte polarization, etc. The sensors may provide input/measurements to the BMU's processor and/or the processor(s) 122.

Also shown in FIG. 1 is at least one light source 193 which may be, e.g., a light emitting diode (LED). The at least one light source 193 may be configured to change colors emitted therefrom under control of the processor 122 such as e.g. being configured to emit green light, orange light, blue light, red light, and/or yellow light. Notwithstanding, it is to be understood that in some embodiments the at least one light source 193 may include plural light sources each being; respectively configured to emit light of a different color such as e.g. green light, orange light, blue light, red light, and yellow light.

Still further, the system 100 may include a vibration element 195 that may be and/or include e.g. a motor for moving an eccentric weight of the vibration element to generate a vibration or other haptic effect at the system 100.

Additionally, though not shown for clarity, in some embodiments the system 100 may include a gyroscope that senses and/or measures the orientation of the system 100 and provides input related thereto to the processor 122, an accelerometer that senses acceleration and/or movement of the system 100 and provides input related thereto to the processor 122, an audio receiver/microphone that provides input from the microphone to the processor 122 based on audio that is detected, such as via a user providing audible input to the microphone, and a camera that gathers one or more images and provides input related thereto to the processor 122. The camera may be a thermal imaging camera, a digital camera such as a webcam, a three-dimensional (3D) camera, and/or a camera otherwise integrated into the system 100 and controllable by the processor 122 to gather pictures/images and/or video. Still further, and also not shown for clarity, the system 100 may include a GPS transceiver that is configured to receive geographic position information from at least one satellite and provide the information to the processor 122. However, it is to be understood that another suitable position receiver other than a UPS receiver may be used in accordance with present principles to determine the location of the system 100.

It is to be understood that an example client device or other machine/computer may include fewer or more features than shown on the system 100 of FIG. 1. In any case, it is to be understood at least based on the foregoing that the system 100 is configured to undertake present principles.

Figure 2:
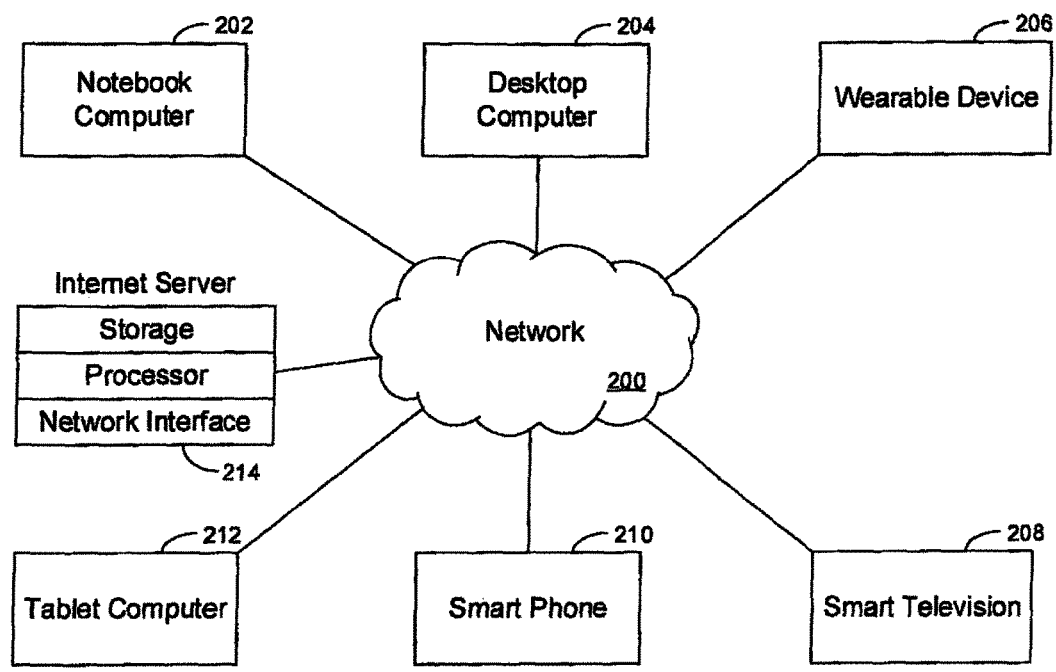
FIG. 2 is an example block diagram of a network of devices in accordance with present principles.

Turning now to FIG. 2, example devices are shown communicating over a network 200 such as the Internet in accordance with present principles. It is to be understood that each of the devices described in reference to FIG. 2 may include at least some of the features, components, and/or elements of the system 100 described above.

FIG. 2 shows a notebook computer and/or convertible computer 202, a desktop computer 204, a wearable device 206 such as a smart watch, a smart television (TV) 208, a smart phone 210, a tablet computer 212, and a server 214 such as an Internet server that may provide cloud storage accessible to the devices 202-212. It is to be understood that the devices 202-214 are configured to communicate with each other over the network 200 to undertake present principles.

Figure 3:
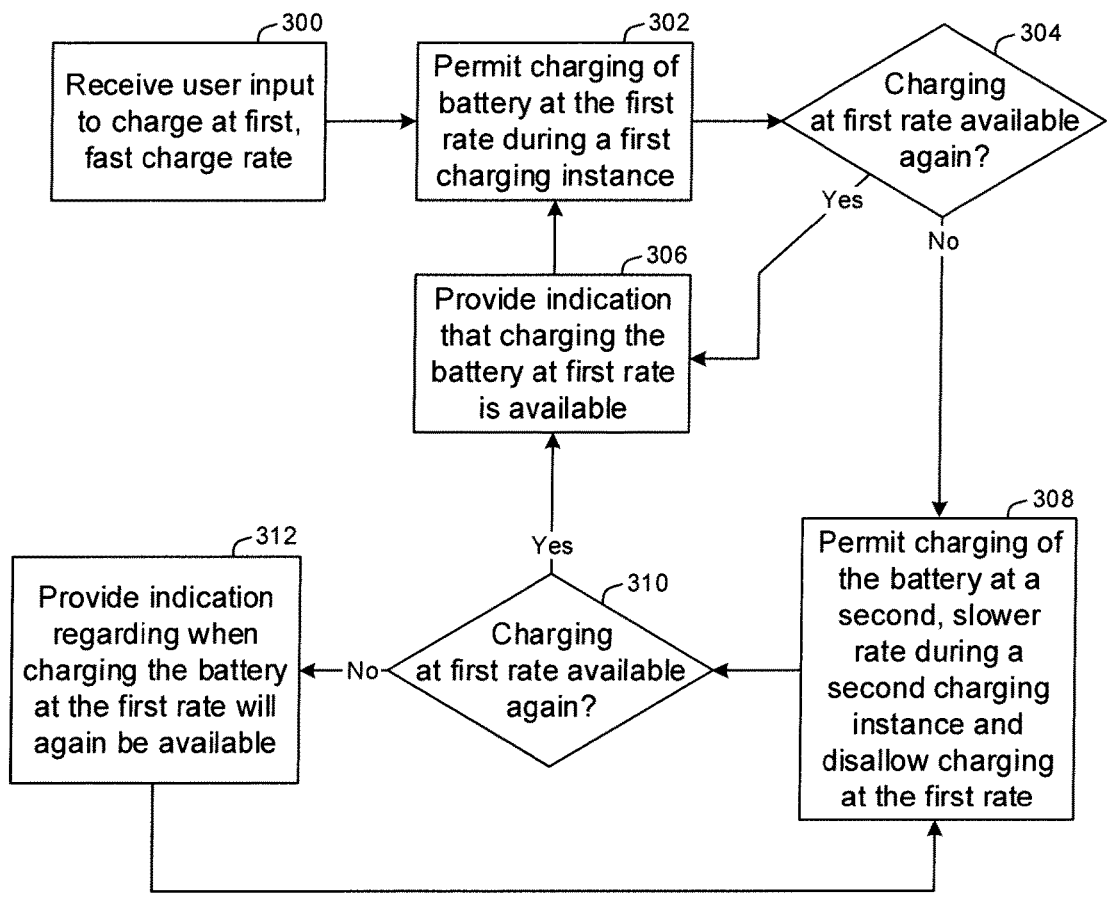
FIG. 3 is a flow chart to an example algorithm in accordance with present principles.

Referring to FIG. 3, it shows example logic that may be executed by a device such as the system 100 to charge a battery at different charge rates and to indicate when charging at one of the relatively faster rates of the different rates is available in accordance with present principles. Beginning at block 300, the device may receive user input to charge the device's battery at a first charge rate that is faster than the battery's normal charge rate. The device may then move to block 302 where it permits charging of the battery at the first charge rate during a first charging instance.

The device may then move to decision diamond 304 where, for example responsive to cessation of the first charging instance and/or the charge being completed, the device may determine whether charging at the first charge rate is available again. The determination at diamond 304 may be bawd on one or more types of data accessible to the device.

In some examples, the device may access data stored in its storage for the determination at diamond 304, where the data originated from and/or was provided by the device's manufacturer. This data may indicate a threshold number of charges of at least a threshold charge amount (with such a charge being one example of a "charge cycle") that the device's battery is to undergo, subsequent to a charging instance using the first charge rate, using at least one rate slower than the first charge rate and before the battery is again available for charging at the first, faster charge rate.

For example, the manufacturer of the device and/or battery may provide threshold data based on testing the manufacturer has done on how many normal-rate charges the battery should undergo based on the battery's composition and/or the chemistry of its parts in order to sufficiently reduce or dissipate battery degradation, such as lithium plating, that the manufacturer has predicted through testing as typically occurring while charging the type of battery in the device at least a minimal amount and/or for a minimal amount of time. Thus, in this example the determination at diamond 304 may be based on whether the battery has undergone a manufacturer-specified threshold number of normal-rate charges (e.g., each of at least a threshold charge amount of a particular percentage and/or voltage) since the first charging instance, with an affirmative determination causing the device to proceed to block 306 and a negative determination causing the device to proceed to block 308. Blocks 306 and 308 will be discussed further below.

However, first note that in some examples this threshold number of charges may vary based on the actual rate of the first charge rate. For example, more charges at the normal rate may be used for the threshold the Faster the first rate. E.g., charging at a rate of 3.0 C may have a threshold number of subsequent charges of ten associated with it, charging at a rate of 3.5 C may have a threshold number of subsequent charges of fifteen associated with it, and charging at a rate of 4.0 C may have a threshold number of subsequent charges of twenty associated with it. Such correlations may be stored in a relational database accessible to the device.

Additionally, the determination at diamond 304 may be based on still other types of data in order to predict whether lithium plating or other types of battery degradation (e.g., for non-lithium ion batteries) may have occurred and thus whether charging at the first rate is again available or not. For instance, data from one or more sensors that sense various metrics related to the battery may be received by the device's CPU (e.g., via the battery's battery management unit (BMU) and/or directly from the sensors) and/or by the battery's BMU if executing all or part of the present logic.

Examples of data that may be received and used to determine whether charging at the first charge rate is available again may include discharge voltage data, where the processor may receive such data and identify that a relatively higher cell discharge voltage than usual and/or than a threshold amount may be indicative of lithium plating and even a particular amount thereof. As another example, charge voltage data and/or overpotential data may be used, where the processor may receive suety data and identify that an increase in anode overpotential (e.g., during charging) may be indicative of lithium plating and even a particular amount thereof. As yet another example, resistance data may be used, where the processor may receive such data and identify that resistance changes during charging of the battery, such as an increase and/or peak in anode resistance, may be indicative of lithium plating and even a particular amount thereof.

As still another example, electrolyte polarization data may be used, where the processor may receive such data and identify that changes in electrolyte polarization, such as an increase in electrolyte polarization, may be indicative of lithium plating and even a particular amount thereof. As but one more example, calorimetry data may be used, where the processor may receive such data and identify that more heat and/or heat dissipation than would otherwise be expected may be indicative of lithium plating and even a particular amount thereof.

In some embodiments, when a particular amount of lithium plating or another type of battery degradation is identifiable from a received metric, the device may receive/identity the amount and compare it to a threshold amount (e.g., a threshold level/amount of lithium plating) for that particular battery degradation type and/or battery type to determine whether battery degradation is above or below the threshold. Thus, the received metric being above the threshold may lead to a determination that the metric is indicative of battery degradation, and the received metric being below the threshold may lead to a determination that the metric is not indicative of battery degradation.

It is to be understood that identification of a certain metric as being indicative of battery degradation such as lithium plating may result in a negative determination at diamond 304, which would cause the device to move to block 308. Conversely, identification of a certain metric as not being indicative of battery degradation may result in an affirmative determination at diamond 304, which would cause the device to move to block 306.

Now describing block 306, the device may provide an indication at the device that charging the device's battery at the first rate is again available. In some examples, the indication may be provided responsive to the affirmative determination at block 304, and/or may be provided at a user interface (UI) at which user input may be provided to control charging of the battery (such as once a user invokes the UI and it is presented on a display). From block 306 the logic may then proceed back to block 302 where the logic may again permit charging of the batter at the first rate during a subsequent charging instance.

Describing block 308, which may be arrived at based on a negative determination at diamond 304, the device may permit charging of the battery at one or more slower rates during one or more subsequent charging instances to the first charging instance. Also at block 308, the device may disallow charging at the first rate and/or any rate raster than the normal rate for the battery. From block 308 the logic may proceed to decision diamond 310, where the logic may again determine whether charging at the first rate is available. The determination at diamond 310 may be made similarly to any one or more of the ways the determination of diamond 304 may be made as discussed above.

An affirmative determination at diamond 310 may cause the device to move to block 306 and proceed therefrom as described above. However, a negative determination at diamond 310 instead causes the device to move to block 312. At block 312 the device may provide an indication regarding when charging at one or more rates faster than the normal rate, such as the first rate discussed above, will again be available. The time that charging, at one or more faster rates will again be available may be based on data in a relational database data that is accessed by the device and that correlates amounts of one or more of the types of metrics discussed above with respective expected times at which a particular faster-rate charge will again be available based on the respective amounts. The time that is identified may be provided as part of the indication provided at block 312.

The time that charging at one or more faster rates will again be available may also be based on how many of the threshold charges discussed above the device is still to undergo before faster-rate charging is again available. Thus, the indication provided at block 312 may include an indication of the number of normal charges left IDT the battery to undergo before fluster-rate charging is available, in addition to or in lieu of an indication of an estimated length of time and/or particular time that faster-rate charging will again be available that is estimated by the device based on a charge history of normal charges (and/or other charges) for the device. From block 312, the device may then revert back to block 308 and proceed therefrom.

Before moving on in the detailed description, it is to be understood in reference to FIG. 3 that the indications provided at blocks 306 and 312 may be provided on the device's display, via one or more light sources other than the display such as LEDs (e.g., with different colors being used for respectively indicating the indications of blocks 306 and 312), audibly using a speaker on the device to present the indications audibly using an automated voice and/or differing, tones for each respective one of the indications of blocks 306 and 312, and/or haptically using a vibration element on the device to present the indications haptically using differing vibration patterns for each respective one of the indications of blocks 306 and 312.

Figure 4:
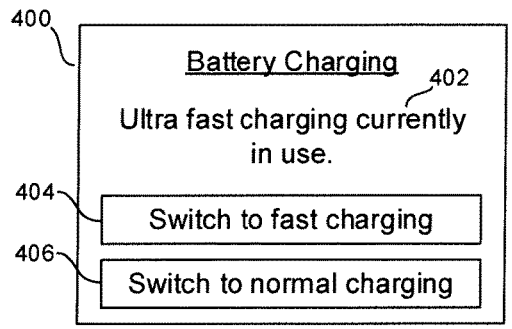
FIGS. 4-7 show example user interfaces (UI) in accordance with present principles.

Now referring to FIG. 4, it shows an example UI 400 presentable on a display controlled by the device (e.g., on the device itself), with the UI 400 including an indicator 402 that a faster-than-normal charging for the device's battery is currently being performed. The faster-than-normal charging is called "ultra fast charging" in this example, and it may be at a rate of 10 C or more. The UI 400 may also include a selector 404 that is selectable to command the device to change to at a relatively slower but still faster than normal charge (e.g., over 2 Cs) to thus charge the battery faster than normal but while potentially minimizing battery degradation such as lithium plating that may otherwise occur during the ultra-fast charging. Still further, the UI 400 may include a selector 406 that is selectable to command the device to change to charge the battery at its normal rate (e.g., C/3).

Figure 5:
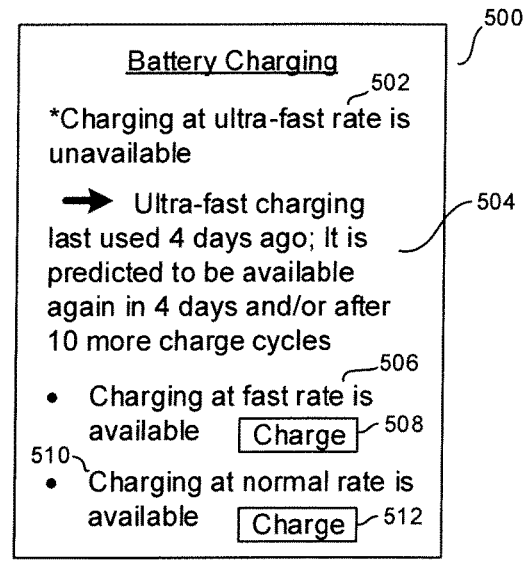

FIG. 5 shows a UI 500 that may be presented on a display, for example, based on a user command to launch a battery application for controlling charging of the battery and/or based on a user command to present the UI 500 itself. The UI 500 may include an indication 502 that charging at the device's ultra-fast rate is unavailable, as well as an indication 504 that may be a part of the indication 502 or separate therefrom. The indication 504 may indicate when ultra-fast charging was last used (in this case, four days ago), as well as indicating when the device has predicted that ultra-fast charging will again be available (in this case, in another four days) and/or how many more normal charge cycles the battery is to undergo before ultra-fast charging will again be available (in this case, after ten more charge cycles).

The UI 500 of FIG. 5 may also include an indication 506 that charging at a "fast" rate (e.g., 4C) is available, with the fast rate being faster than charging at the battery's normal rate but slower than charging at the ultra-fast rate. The indication 506 may be accompanied by a selector 508 that is selectable to command the device to charge using the fast rate to thus charge the battery faster than normal but while potentially minimizing battery degradation such as lithium plating that may occur during the ultra-fast charging.

The UI 500 may also include an indication 510 that charging at the normal rate is available. The indication 510 may be accompanied by a selector 512 that is selectable to command the device to charge using the normal charge rate.

Figure 6:
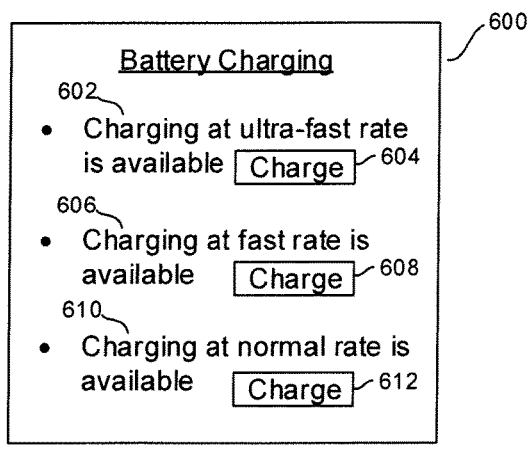

FIG. 6 shows a UI 600 that may be presented on a display, for example, based on a user command to launch a battery application for controlling charging of the battery and/or based on a user command to present the UI 600 itself. The UI 600 may include an indication 602 that charging at the device's ultra-fast rate is available. The indication 602 may be accompanied by a selector 604 that is selectable to command the device to charge the device's battery using the ultra-fast charge rate. In some example embodiments, while the UIs 500 and/or 600 may be presented at any time based on a user command to do so, the selector 604 itself may only be presented on the UI 600 and/or selectable from the UI 600 responsive to a determination that charging the battery at the ultra-fast rate is again available.

The UI 600 may also include an indication 606 that charging at the fast rate is available. The indication 606 may be accompanied by a selector 608 that is selectable to command the device to charge the battery using the last charge rate. Even further, the UI 600 may include an indication 610 that charging at the normal rate is available. The indication 610 may be accompanied by a selector 612 that is selectable to command the device to charge using the normal charge rate.

Figure 7:
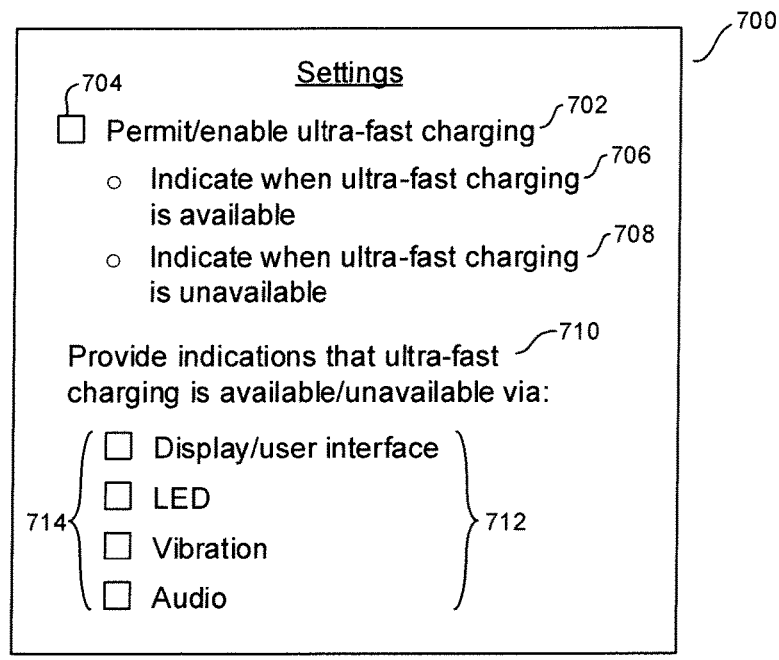

Before moving on to the description of FIG. 7, it is to be understood that the UIs 500 and/or 600, and even certain indications presented thereon as discussed above, may be presented responsive to cessation of ultra-fast charging in a given charging instance so that a user may see when ultra-fast charging will again be available after stopping an ultra-fast charge.

Now describing FIG. 7, it shows a UI 700 presentable on a display for configuring settings of a device in accordance with present principles. The UI 700 may include a first option 702 enableable using check box 704 to permit and/or enable at least one faster-than-normal charging rate for charging the battery, such as the ultra-fast charging rate discussed above. When the option 702 is enabled, two sub-options 706 and 708 may be respectively enableable using the respective radio buttons shown adjacent to each one. Sub-option 706 is enableable to configure the device to provide indications when at least one faster-than-normal charging rate is available, while sub-option 708 is enableable to configure the device to provide indications when at least one faster-than-normal charging rate is unavailable.

The UI 700 may also include a setting 710 pertaining to one or more means 712 of presenting indications, such as via a display and/or UI, via another light source, via vibrations, and via audio. Each one of the means 712 may be respectively enabled by providing input to the check boxes 714 shown adjacent to each one, and more than one may be enabled at the same time.

Before concluding, it is to be understood that although a software application for undertaking present principles may be vended with a device such as the system 100, present principles apply in instances where such an application is downloaded from a server to a device over a network such as the Internet. Furthermore, present principles apply in instances where such an application is included on a computer readable storage medium that is being vended and/or provided, where the computer readable storage medium is not a transitory signal and/or a signal per se.

It is to be understood that whilst present principals have been described with reference to some example embodiments, these are not intended to be limiting, and that various alternative arrangements may be used to implement the subject matter claimed herein. Components included in one embodiment can be used in other embodiments in any appropriate combination. For example, any of the various components described herein and/or depicted in the Figures may be combined, interchanged or excluded from other embodiments.

What is claimed is:

1. A device, comprising:
a processor;
at least one system component accessible to the processor;
a battery accessible to the processor, wherein the battery provides power to the processor and the at least one system component;
a display accessible to the processor and powered by the battery; and
storage accessible to the processor and bearing instructions executable by the processor to:
permit charging of the battery at a first rate during a first charging instance;
permit charging of the battery at a second rate during a second charging instance, the second rate being slower than the first rate and the second charging instance being subsequent to the first charging instance;
provide an indication regarding the availability of again charging the battery at the first rate subsequent to the first charging instance; and
disallow charging of the battery at the first rate at least until a determination is made that charging the battery at the first rate is again available, the indication being provided responsive to the determination, the determination being based on an identification that a threshold number of charging instances greater than one have occurred in which the battery has been charged using at least one rate other than the first rate; and
based on the determination, again allow charging of the battery at the first rate.

2. The device of claim 1, wherein the determination is based at least in part on data accessible to the processor.

3. The device of claim 2, wherein the data is stored at the device and originates from a manufacturer.

4. The device of claim 2, wherein the at least one rate other than the first rate is a rate(s) slower than the first rate.

5. The device of claim 2, comprising a battery management unit (BMU), and wherein the data is received from the BMU.

6. The device of claim 5, wherein the data comprises one or more of: discharge data, charge data, overpotential data, anode resistance data, electrolyte polarization data, and temperature data.

7. The device of claim 1, wherein the instructions are executable by the processor to:
provide the indication one or more of: on the display, via a light source other than the display, audibly, and haptically.

8. The device of claim 1, wherein the instructions are executable by the processor to:
provide the indication as part of a user interface (UI) presentable on the display and at which input is receivable to control charging of the battery.

9. The device of claim 8, wherein a selector is presentable on the UI, the selector being selectable to invoke charging at the first rate.

10. The device of claim 9, wherein the selector is presented on the UI responsive to a determination that charging the battery at the first rate is again available.

11. The device of claim 1, wherein the instructions are executable by the processor to:
provide the indication responsive to cessation of the first charging instance.

12. A method, comprising:
permitting charging of a battery at a first rate during at least a first charging instance;
subsequent to permitting charging of the battery at the first rate during at least the first charging instance, disallowing charging of the battery at the first rate but permitting charging of the battery at one or more other rates for a threshold number of charging instances, the one or more other rates being slower than the first rate;
based on the battery being charged at the one or more other rates for the threshold number of charging instances, again allowing charging of the battery at the first rate; and
providing an indicator at a device regarding the availability of again charging the battery at the first rate.

13. The method of claim 12, comprising:
providing the indicator based on a prediction that lithium plating related to the battery is at least below a threshold level.

14. The method of claim 13, wherein the prediction is based at least in part on identification of the battery as being charged at the one or more other rates for the threshold number of charging instances, and wherein the threshold number of charging instances varies based on the first rate.

15. A computer readable storage medium that is not a transitory signal, the computer readable storage medium comprising instructions executable by a processor to:
permit charging of a battery at a first rate during a first charging instance; and
wait until, subsequent to the first charging instance, a threshold number of additional charge instances has transpired using at least one other rate slower than the first rate before again permitting charging of the battery at the first rate.

16. The computer readable storage medium of claim 15, wherein the instructions are executable by the processor to:
responsive to the threshold number of additional charge instances transpiring, make available, at a device accessible to the processor, an indicator regarding the availability charging the battery at the first rate.

17. The computer readable storage medium of claim 15, wherein the instructions are executable by the processor to:
subsequent to the first charging instance but before the threshold number of additional charge instances transpires, permit charging of the battery using at least one relatively slower rate than the first rate but not permit charging of the battery using one or more of the first rate and a second rate faster than the first rate.

18. The device of claim 1, wherein the at least one rate other than the first rate comprises the second rate.

19. The method of claim 12, wherein the indicator is presented on a display and indicates a number of charging instances remaining that are to occur in the future using the one or more other rates before charging will again be permitted using the first rate.

20. The computer readable storage medium of claim 15, wherein the threshold number of additional charge instances varies based on the first rate.

* * * * *